United States Patent
Oh et al.

(10) Patent No.: US 7,574,230 B1
(45) Date of Patent: Aug. 11, 2009

(54) REMOTE BASE STATION WITH TRANSMIT POWER CONTROL

(75) Inventors: Dae-Sik Oh, Overland Park, KS (US); Mark L. Yarkosky, Overland Park, KS (US); Kristin A. Hayne, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 731 days.

(21) Appl. No.: 10/873,588

(22) Filed: Jun. 21, 2004

Related U.S. Application Data

(63) Continuation-in-part of application No. 09/871,081, filed on May 31, 2001, now Pat. No. 7,260,415.

(51) Int. Cl.
*H04B 7/00* (2006.01)
(52) U.S. Cl. ...................................... 455/522
(58) Field of Classification Search ................. 455/522
See application file for complete search history.

(56) References Cited

U.S. PATENT DOCUMENTS

| | | | |
|---|---|---|---|
| 5,809,398 A | 9/1998 | Moberg et al. | 455/17 |
| 5,987,304 A * | 11/1999 | Latt | 455/17 |
| 6,132,306 A | 10/2000 | Trompower | 455/11.1 |
| 6,154,638 A * | 11/2000 | Cheng et al. | 455/67.11 |
| 6,341,224 B1 * | 1/2002 | Dohi et al. | 455/522 |
| 6,404,775 B1 | 6/2002 | Leslie et al. | 370/466 |
| 6,442,393 B1 * | 8/2002 | Hogan | 455/456.5 |
| 6,490,460 B1 * | 12/2002 | Soliman | 455/522 |
| 6,496,531 B1 * | 12/2002 | Kamel et al. | 375/130 |
| 6,571,284 B1 | 5/2003 | Suonvieri | 709/221 |
| 6,603,983 B2 * | 8/2003 | Hildebrand | 455/561 |
| 6,760,594 B1 * | 7/2004 | Murasawa et al. | 455/512 |
| 2002/0044594 A1 | 4/2002 | Bongfeldt | 375/213 |
| 2002/0045431 A1 * | 4/2002 | Bongfeldt | 455/234.1 |
| 2005/0265300 A1 * | 12/2005 | van Rensburg | 370/342 |

OTHER PUBLICATIONS

Steve Adams, "*The Demands on In-Building Solutions—Using smart antennas and adaptive techniques to improve in-building technique*", Wireless Business & Technology Magazine, May 20, 2003.
Spotwave Wireless, Inc., SpotCell™ 112 (PCS-CDMA), "*Product Overview*", www.spotwave.com, 2003.
Bennet Wong, *Eliminate the Backhaul Link*, Airnet Feature Story, AirNet Communications Corporation, Oct. 1, 1999.
Bennet Wong, "*Filling the Generation Gap with Software-Defined, Broadband Radio*", CTI Developer, vol. 4, No. 9, Reprint Services, AirNet Communications Corporation, Sep. 1999.

* cited by examiner

*Primary Examiner*—Matthew D Anderson
*Assistant Examiner*—Bobbak Safaipour

(57) ABSTRACT

A method of communicating with a mobile station. The method includes receiving forward link signals from a central base station at a remote base station and transmitting the forward link signals from the remote base station to the mobile station. The method also includes receiving reverse link signals from the mobile station at the remote base station and transmitting the reverse link signals from the remote base station to the central base station. The method further includes cooperatively adjusting a transmission power level for communication between the mobile station and the remote base station.

23 Claims, 5 Drawing Sheets

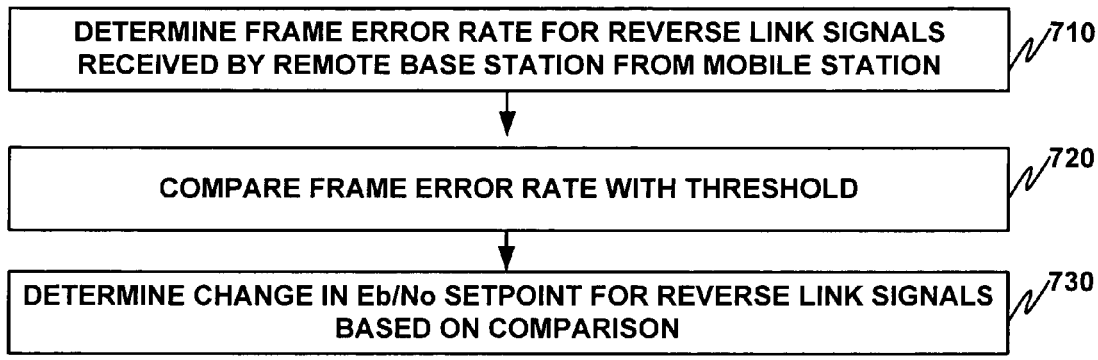
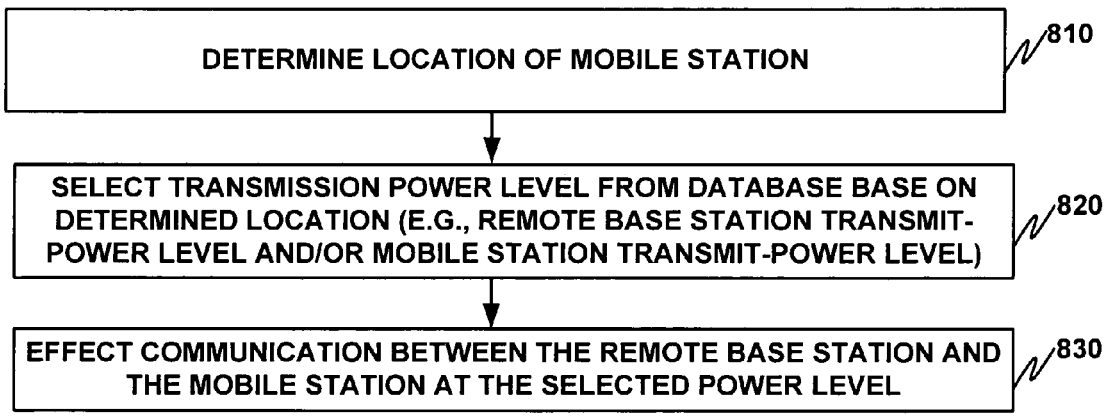

REMOTE BASE STATION WITH TRANSMIT POWER CONTROL

CROSS-REFERENCE TO RELATED APPLICATIONS

This application is a continuation-in-part application of U.S. patent application Ser. No. 09/871,081 to Dae-Sik Oh, filed on May 31, 2001. The entire disclosure of U.S. patent application Ser. No. 09/871,081 is herein incorporated by reference.

BACKGROUND

I. Field of the Invention

This invention is directed to the field of wireless communications. More specifically, this is invention is directed to the use, in a wireless communication system, of a central base station and one or more remote base stations that include transmit power control.

II. Description of Related Art

Wireless communication is an ever growing industry. Wireless communication devices are applied in numerous applications, such as cellular communications, wireless (computer) networking, data delivery, and any number of other uses. For applications that employ bi-directional communication, such as cellular communications and wireless networking, signals are sent and received from at least two points. In the context of cellular communications, signals are normally communicated between a base station (e.g., a radio tower and associated controller) and one or more mobile devices (e.g., cellular phones, wireless personal digital assistants, etc.).

Such base stations currently include essentially all of the functionality for implementing a radio link with the mobile stations, which are typically implemented in one or more sectors (e.g., geographic coverage areas). Current base stations assign Walsh codes, determine (pseudo-noise) PN offsets, assign/define cell sectors and channels for communication traffic and regulate transmission power for the forward link (to the mobile) and reverse link (from the mobile) signals in cooperation with the mobile station(s). The use of Walsh codes and PN offsets is known and, for the sake of brevity, will not be described in detail here. Briefly, however, the use of Walsh codes and PN offsets allows for each of the sectors of a cell site and geographically proximate cell sites to use the same carrier channel frequency pairs. Additionally, such base stations also communicate with (or include) a base station controller to facilitate communication with a mobile switching center, etc. For a code division multiple access wireless communication system (CDMA), these aspects are described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

In wireless communication systems, it is not uncommon to have a certain geographic areas that have high communication traffic volume during certain time periods and low volume during other time periods (e.g., an urban business district during normal business hours as compared to evenings and weekends). Further, there may be geographically adjacent or nearby areas that have opposite communication traffic volume patterns (e.g. high traffic volume during the low traffic volume periods of the first area and low traffic volume during the high traffic volume time periods of the first area, such as a suburban residential area neighboring the urban business center.)

During time periods when communication traffic is low in a certain geographic area, the resources of any base stations serving those areas may be mostly idle during such times. Such inefficient use of base station resources is undesirable because implementing and operating a base station is costly. Therefore, it is desirable to more effectively utilize the resources of such base stations in order to reduce the overall costs associated with implementing and operating a mobile telecommunication system.

SUMMARY

Embodiments of the present invention realize this objective by implementing power control functions in one or more remote base stations that are associated with, and share the resources of, a central base station. In an exemplary embodiment, the central base station communicates with a plurality of remote base stations. The remote base stations may effectively act as wireless repeaters that also implement transmission power control functions. Mobile stations operation in such a system would communicate directly with the remote base station(s) and the remote base stations would act a relay point for wireless communication signals between the mobiles stations and the central base station. In this embodiment, the central base station would still assign Walsh codes, sectors, communication channels, PN offsets and interfaces with (or includes) a base station controller.

The remote base stations implement the functions of a wireless repeater by receiving forward link signals from the central base station as well as transmitting reverse link signals to the central base station. As with a wireless repeater, the remote base stations also transmit forward link signals to mobile stations and receive reverse link signals from the mobile stations. Because the remote base stations and central base station are geographically fixed, communication between them may be accomplished using a fixed transmission power. Therefore, the central base station does not need to implement power control functions for communications between the central base station and the remote base station(s).

The remote base stations may implement power control functions (in cooperation with the mobile stations) in any number of ways. For example, traditional CDMA power control techniques may be employed. In such techniques a predetermined setpoint for spectral density ($E_b/N_o$, where $E_b$ represents signal strength and $N_o$ represents noise in the air interface) and a predetermined threshold for frame error rate may be used. The setpoint and threshold are then compared with measured spectral density values and calculated frame error rates. The transmission power levels and the setpoints for both the reverse and forward link are then adjusted based on these comparisons. Alternatively, location based power control may be employed.

In such a configuration, the central base station's resources are shared by each of the remote base stations associated with the central base station. This allows the central base station's resources to be allocated amongst the various remote base stations based on the amount of communication traffic at any particular time in the geographic regions being served by the remote base stations. Referring to the earlier example of a business district and a neighboring suburban residential area, a single central base station may be implemented with one or more associated remote base stations being implemented in the business district and one or more associated remote base stations being implemented in the residential area. The resources of the central base station may then be allocated among the remote base stations based on the communication traffic volume of each remote base station at various times of the day (e.g., more resources allocated in the business district during the day while more resources are allocated in the residential area in the evening).

Such an implementation may produce a significant capital cost savings for wireless carriers as full-function base stations do not have to be implemented at each location, and the resources of the central base station are more efficiently used because they are shared by a plurality of remote base stations. Furthermore, such embodiments may allow for relatively inexpensive extension of the geographic coverage area for a wireless carrier (due to the wireless repeater functionality of the remote base stations), as relatively less expensive remote base stations may be implemented, as compared to implementing full featured base stations.

These and other aspects will become apparent to those of ordinary skill in the art by reading the following detailed description, with reference, where appropriate, to the accompanying drawings. Further, it should be understood that the embodiments noted in this summary are not intended to limit the scope of the invention as claimed.

BRIEF DESCRIPTION OF THE DRAWINGS

Exemplary embodiments of the present invention are described herein with reference to the drawings, in which:

FIG. 7 is a flowchart illustrating a method for modifying a setpoint for an $E_b/N_o$ value for reverse link signals transmitted to a remote base station from a mobile station in accordance with an embodiment of the invention; and FIG. 8 is a flowchart illustrating a method for selecting a transmit power for communication between a remote base station and a mobile station in accordance with an embodiment of the invention.

DETAILED DESCRIPTION

While embodiments of wireless communication systems and embodiments of components of such systems are generally discussed herein with respect to a Code Division Multiple Access (CDMA)—Personal Communications System communication network, it will be appreciated that the invention is not limited in this respect and that embodiments of the invention may be implemented in any number of wireless communication systems. As in most telecommunications applications, it will also be appreciated that many of the elements of the various embodiments described herein are functional entities that may be implemented as hardware, firmware and/or software, and as discrete components or in conjunction with other components, in any suitable combination and location.

Wireless Communication System Including a Remote Base Station

Figure 1:
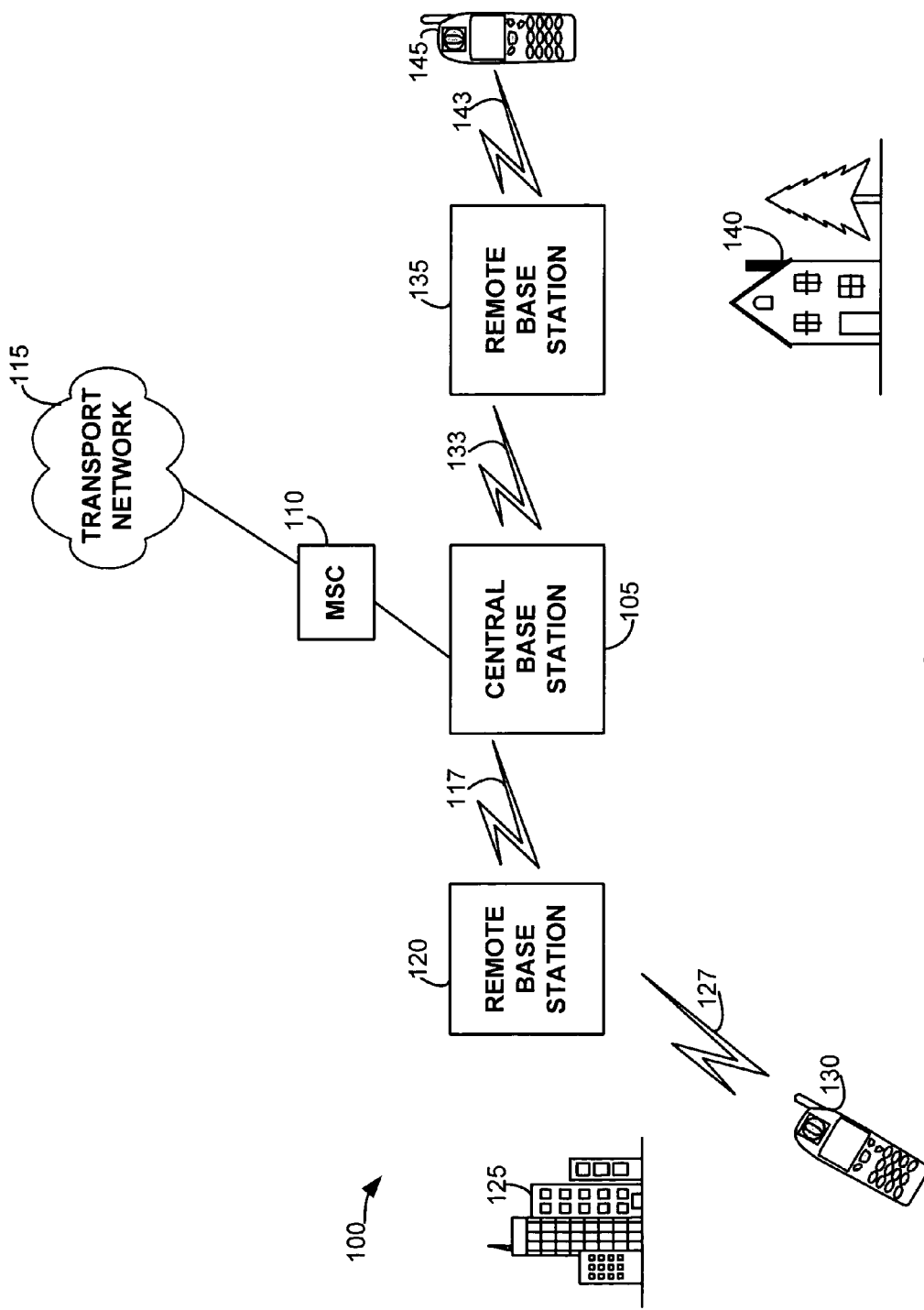
FIG. 1 is a block diagram illustrating a wireless communication system in accordance with an embodiment of the invention.

Referring to FIG. 1, a block diagram illustrating a wireless communication system 100 is shown. The system 100 includes a central base station 105 that is coupled with a mobile switching center (MSC) 110. The MSC 110 is, in turn, coupled (directly or indirectly, such a via a packet data serving node) with a transport network 115. The transport network 115 may include, for example, a wireless communication network, a packet-switched network and/or a public-switched-telephone network. Such configurations are known and will not be described in detail here.

Briefly, however, the central base station 105 for the system 100 includes a base transceiver station (e.g., a radio antenna tower and associated components) and a base station controller (for managing communication between the MSC 115 and the base transceiver station). For the system 100, the central base station 105 is a full featured base station that assigns Walsh codes, establishes communication sectors, assigns communication channels, implements PN offsets and interfaces with the MSC 110 (via the base station controller), along with carrying out any number of other functions.

The central base station 105 communicates over an air interface 117 with a remote base station 120. In like fashion with the scenario described above, the remote base station 120 is located in an urban business district 125. The remote base station 120, in turn, communicates over an air interface 127 with a mobile station 130. The mobile station 130 may be a wireless phone, a personal digital assistant, a wireless web browser, a laptop computer with a wireless transceiver, among any number of other possible devices.

In the system 100, the remote base station 120 acts as a wireless repeater for forward link signals and reverse link signals communicated between the central base station 105 and the mobile station 130. Additionally, as will be discussed further below, the remote base station 120 also implements transmission power control functions in cooperation with the mobile station 130 for communication between the remote base station 120 and the mobile station 130.

The central base station 105 also communicates over an air interface 133 (which is shown separate from air interface 117 for purposes of illustration) with a remote base station 135. Also in like fashion with above scenario, the remote base station 135 is located in a suburban residential area 140. As with the remote base station 120, the remote base station 135 communicates over an air interface 143 with a mobile station 145 and acts as a wireless repeater for forward link signals and reverse link signals communicated between the central base station 105 and the mobile station 130. Furthermore, the remote base station 135 implements transmission power control functions (which are discussed below) in cooperation with the mobile station 145 for communication between the remote base station 135 and the mobile station 145.

Because the central base station 105 and the remote base stations 120,135 are fixed in their location, radio communication between the central base station 105 and the remote base stations 120,135 may be accomplished at substantially constant transmission powers without the use of power control functions. However, the central base station may still implement power control functions for direct communication with mobile stations (e.g., communication not directed through a remote base station). It will be appreciated that additional remote base stations may be implemented in the system 100, as well as additional central base stations. Also, any number of mobile stations may be in communication with remote base stations 120, 135.

The use of the remote base stations 120,135 allows for the resources of the full featured central base station 105 to be shared. Such a configuration may be used where varying amounts of wireless communication traffic occur at different times of the day in geographically proximate areas (such as the urban center 125 and the residential area 140, as discussed above). This sharing of the resources of the central base station 105 by the remote base stations 120,135 may result in reducing the costs associated with implementing and operating the system 100 or similar systems.

Specifically, because the remote base stations 120,135 share the resources of the central base station 105, they are relatively less expensive to implement as well as to operate and maintain. For example, the remote base stations 120,135 do not include (and are not in direct communication with) a base station controller, as they share this resource of the central base station 105. Further, the remote base stations 120,135 do not include any hardware, firmware or software for assigning Walsh codes, implementing communication sectors, implementing PN offsets, etc. Thus, because the remote base stations 120,135 and are relatively inexpensive as compared to a full featured base station (e.g., the central base station 105) and may be used extend the coverage area of the central base station 105, the overall cost for implementing and operating the system 100 may be reduced as compared to systems that implement full featured base stations at every base station location.

Remote Base Station

Figure 2:
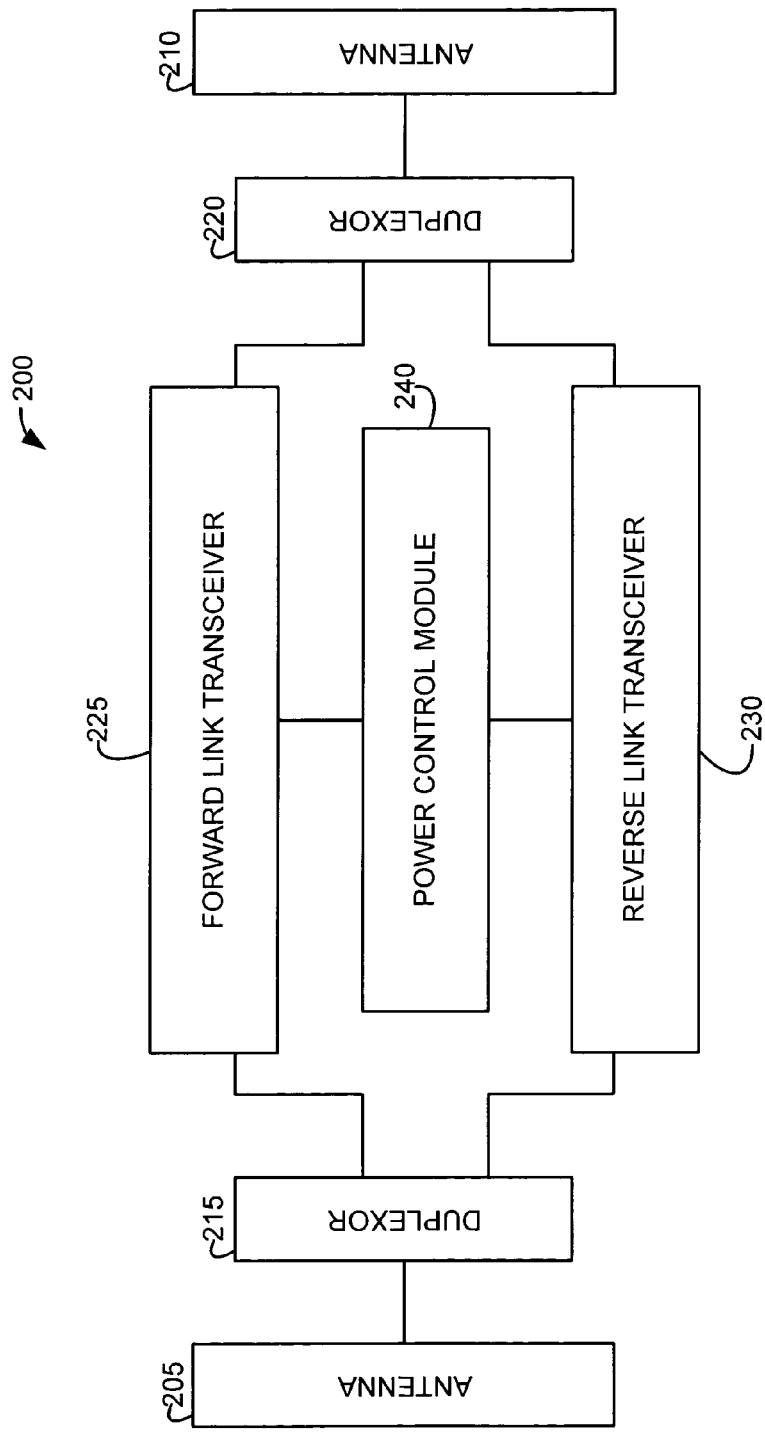
FIG. 2 is a block diagram illustrating a remote base station in accordance with an embodiment of the invention.

Referring now to FIG. 2, a block diagram is shown that illustrates a remote base station 200 that may be implemented in the system of FIG. 1 as remote base stations 120,135. The remote base station 200 will, therefore, be described with further reference to FIG. 1. The remote base station 200 includes an antenna 205 that is used to receive forward link signals from, and transmit reverse link signals to, the central base station 105. The remote base station 200 also includes a second antenna 210 that is used to transmit forward link signals to, and receive reverse link signals from, the mobile station 130, for example.

The antenna 205 is coupled with a duplexor 215, while the antenna 210 is coupled with a duplexor 220. The duplexor 215 provides for concurrent handling of forward and reverse link signals between the remote base station 200 and the central base station 105. Similarly, the duplexor 220 provides for concurrent handling of forward and reverse link signals between the remote base station 200 and the mobile station 130.

The remote base station 200 further includes a forward link transceiver 225 for receiving forward link signals from the central base station 105 (via the antenna 205 and duplexor 215) and transmitting the forward link signals to the mobile station 130 (via the antenna 210 and the duplexor 220). The remote base station 200 also includes a reverse link transceiver 230 for receiving reverse link signals from the mobile station 130 (via the antenna 210 and the duplexor 220) and transmitting the reverse link signals to the central base station 105 (via the antenna 205 and the duplexor 215). The forward link transceiver 225 and the reverse link transceiver 230 include radio frequency circuitry for receiving, processing, amplifying and transmitting wireless communication signals (e.g., reverse and forward link signals).

The remote base station 200 also includes a power control module 240 that is coupled with the forward and reverse link transceiver. As will described further below, the power control module 240 implements service logic in cooperation with a mobile station (such as the mobile station 130) to select, control and/or adjust a transmission power for communication between the remote base station 200 and the mobile station 130 (e.g., reverse and/or forward link signals).

Method of Communicating with a Mobile Station

Figure 3:
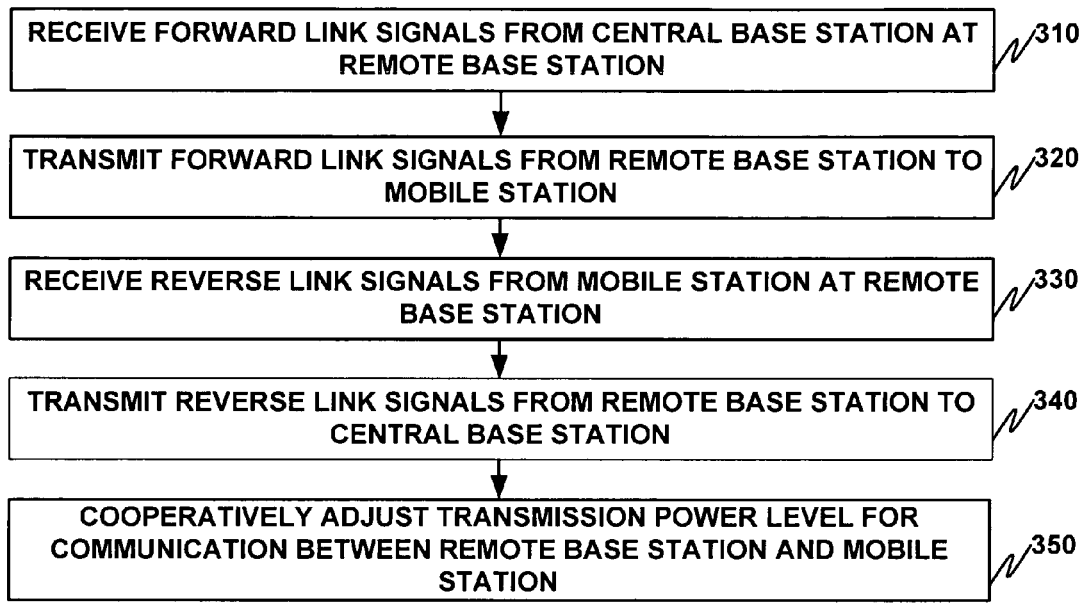
FIG. 3 is a flowchart illustrating a method for communicating with a mobile station in accordance with an embodiment of the invention.

Referring now to FIG. 3, a flowchart illustrating a method of communicating with a mobile station is shown. The method includes, at block 310, receiving forward link signals from a central base station at a remote base station. At block 320 the method includes transmitting the forward link signals from the remote base station to a mobile station. The method includes, at block 330, receiving reverse link signals from the mobile station at the remote base station and, at block 340, transmitting the reverse link signals from the remote base station to the central base station. Implementing the method of FIG. 3 using the remote base station 200 illustrated in FIG. 2 may provide for the steps of blocks 310-340 occurring substantially simultaneously (due to the use of the duplexors 215,220).

The method of FIG. 3 further includes, at block 350, cooperatively adjusting a transmission power level for communication between the remote base station and the mobile station. Any number of techniques may be used to adjust the transmission power level. For example, techniques similar to traditional CDMA power control techniques may be employed. Alternatively, location based power control techniques, such as those described in U.S. patent application Ser. No. 09/871, 081 to Dae-Sik Oh, filed on May 31, 2001, incorporated herein by reference, may be used. Embodiments of such techniques are described in further detail below with reference to FIGS. 4-8.

Methods for Adjusting Transmission Power

Power control techniques that are similar to traditional CDMA transmission power control techniques are illustrated in FIGS. 4-7 and described below. Such techniques may be implemented based on the industry standard IS-2000-2 (published in March 2000 as TIA/EIAIS-2000.2-A). However, because power control is implemented using a remote base station 120 and a mobile station 130 in the system 100, appropriate modifications to such power control techniques may be needed. For purposes of this disclosure, the techniques of FIGS. 4-7 will be described with further reference to the system 100 of FIG. 1 and the remote base station 200 of FIG. 2.

Using such techniques, the remote base station 120 and the mobile station 130, for example, will engage in a two-part power control process for controlling and/or adjusting signal transmission levels. These techniques, for the remote base station 200, are implemented by the power control module 240 in cooperation with a mobile station (such as the mobile station 130 in FIG. 1). For these approaches, the base station will maintain a "setpoint," $E_b/N_o$, which is a decibel measure of the forward link signal energy to noise (spectral density) as received by the mobile station 130. The setpoint represents how strong the remote base station 120's transmitted forward link signals must be for the mobile station 130 to be able to successfully receive bits of data transmitted by the remote base station 120. Given a particular noise level in the air interface 127, if the received forward link signal transmission level is not high enough, the mobile station 130 might not be able to make out the data bits included in the signal as compared to the background noise.

In such an approach, the remote base station 120 (and/or the mobile station 130) will have an initial setpoint designated by the manufacturer of the remote base station 120 (and/or the mobile station 130). Further, the remote base station 120 may continuously estimate the noise level in the air interface 127 based on various factors such as frame error rate or signal strength measurements reported by the mobile station, for instance.

Figure 4:
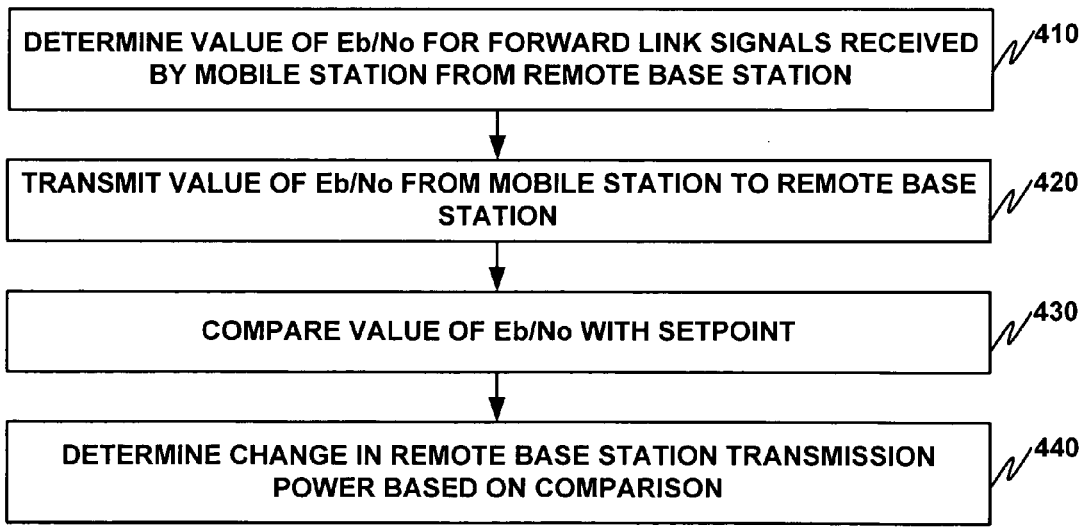
FIG. 4 is a flowchart illustrating a method for adjusting the transmit power of a remote base station in accordance with an embodiment of the invention.
Figure 5:
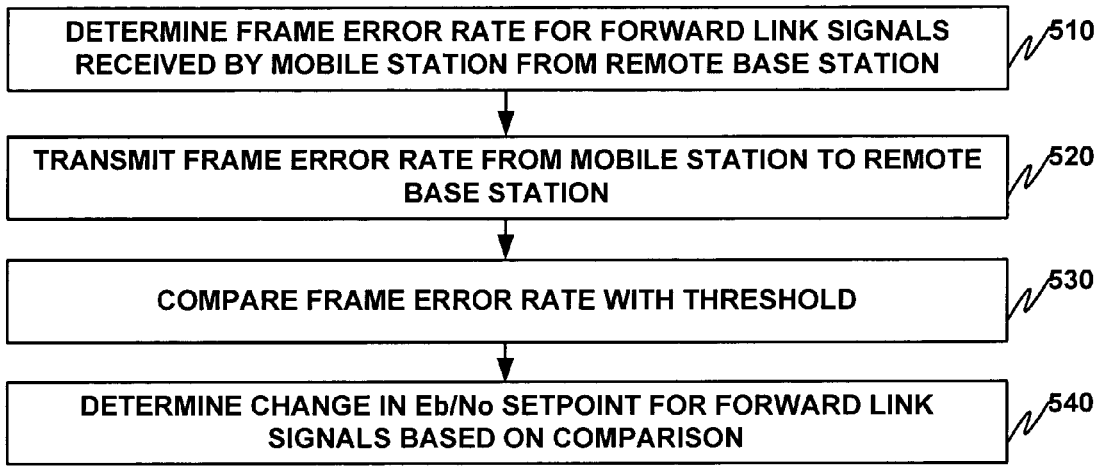
FIG. 5 is a flowchart illustrating a method for modifying a setpoint for an $E_b N_o$ value for forward link signals transmitted to a mobile station from a remote base station in accordance with an embodiment of the invention.
Figure 6:
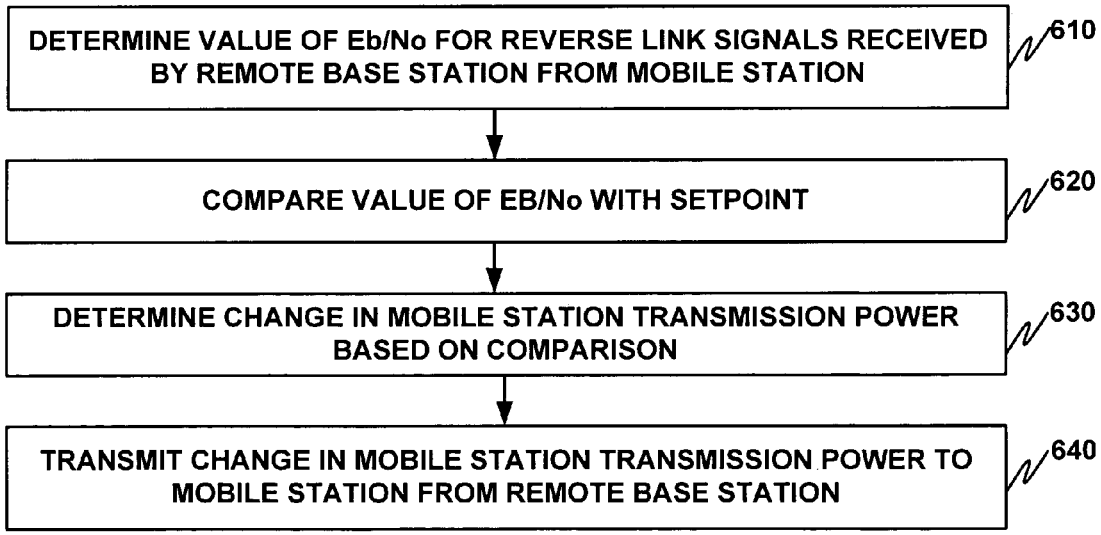
FIG. 6 is a flowchart illustrating a method for adjusting the transmit power of a mobile station in accordance with an embodiment of the invention.

Referring now to FIG. 4, a method for adjusting the transmission power level of a remote base station for forward link signals is illustrated. This method may be used as the first part of the forward link power control process and is termed "open-loop power control." Alternatively, open-loop control may be implemented using reverse link signals, as is illustrated in FIG. 6.

In the open-loop power control method of FIG. 4, at block 410, the mobile station 130 measures the power level of the forward link signals that it receives from the remote base station 120, which will have degraded from the time that they left the remote base station 120. The mobile station 130 will then communicate with the remote base station 120 and provide the remote base station 120 with the measurement at block 420. Given this value and any estimate of noise in the air interface, the remote base station 120 (e.g., using the power control module 240) will then establish a measured value of $E_b/N_o$, which is compared to a setpoint at block 430. If the measured $E_b/N_o$ does not match the setpoint, the power control module 240 will instruct the forward link transceiver 225 to adjust its transmit-power level, typically by a predetermined increment. The power control module 240 will then establish a new measured $E_b/N_o$ value (based on a second measurement by the mobile station 130) and compare it to the setpoint, repeating the process of FIG. 5 until the measured $E_b/N_o$ matches the setpoint.

For instance, if the measured $E_b/N_o$ is too low as compared to the setpoint, then the remote base station 120 (e.g., using the power control module 240) will conclude that the forward link transceiver 225 needs to increase its transmit power and will accordingly instruct the forward link transceiver 225 to increase its transmit power, typically by 1 dB or another increment specified by the power control module 240. Similarly, if the measured $E_b/N_o$ is too high as compared to the setpoint, the power control module 240 will conclude that the forward link transceiver 225 needs to decrease its transmit power and will, therefore, instruct the forward link transceiver 225 to decrease its transmit power, also typically by a 1 dB increment.

After matching the setpoint, communication is then successfully established between the remote base station 120 and the mobile station 130. The remote base station 120 and the mobile station 130 will then enter into the next part of the power control process, referred to as "closed-loop power control", which is illustrated for forward link signals in FIG. 5.

In closed-loop power control, the mobile station 130, at block 510, measures a frame error rate (FER) of forward link signals received from the remote base station 120, i.e., the percentage of frames on the forward link that are in error. These FER measurements are then communicated to the remote base station 120 by the mobile station 130 at block 520. The remote base station 120 (e.g., using the power control module 240) then compares the measured FER to a predetermined FER threshold at block 530.

If the measured FER is greater than the predetermined threshold, the remote base station 120 will conclude that the setpoint should be increased at block 540. In this situation, the power control module 240 will increase the setpoint by an increment, such as 1 dB for instance. As a result, however, the setpoint may be pushed higher than the measured $E_b/N_o$. Therefore, in this situation, the power control module 240 will then instruct the forward link transceiver 225 to increase its transmit-power level.

On the other hand, if the measured FER is less than the predetermined threshold, the power control module 240 will conclude that the setpoint should be reduced at block 540. In this situation, the power control module 240 will reduce the setpoint, similarly by an increment such as 1 dB for instance. As a result, the setpoint may be pushed lower than the measured $E_b/N_o$. Therefore, in this situation, the power control module 240 will instruct the forward link transceiver 225 to reduce its transmit power.

A similar power control process may be used for reverse link signals. An open-loop power control process for reverse link signals is illustrated in FIG. 6. This method includes, at block 610, the remote base station 120 measuring the power level of the reverse link signals that it receives from the mobile station 130 (e.g., with the power control module 240). Given this value and any estimate of noise in the air interface 127, the remote base station 120 will then establish a measured value of $E_b/N_o$ using the power control module 240, which the remote base station 120 will compare to the setpoint at block 620. If the measured $E_b/N_o$ does not match the setpoint, the remote base station 120 will determine a change in the mobile station 130's transmit-power level at block 630 and instruct the mobile station 130 to adjust its transmit-power level accordingly at block 640, typically by a predetermined increment. The remote base station 120 will then establish a new measured $E_b/N_o$ value and compare it to the setpoint, repeating the process of FIG. 6 until the measured $E_b/N_o$ matches the setpoint.

Closed-loop power control for reverse link signals is illustrated by FIG. 7. In closed-loop power control, at block 710, the remote base station 120 will continuously measure the FER of received reverse link signals from the mobile station 130 with the power control module 240 and compare the measured FER to a predetermined FER threshold at block 720. If the measured FER is greater than a predetermined threshold the power control module 240 will conclude that the setpoint should be increased at block 730. In this situation, the remote base station 120 will increase the setpoint by an increment, such as 1 dB for instance. As a result, however, the setpoint may be pushed higher than the measured $E_b/N_o$. Therefore, the remote base station 120 (e.g., using the power control module 240) will instruct the mobile station 130 to increase its transmit power.

On the other hand, if the measured FER is less than the predetermined threshold, the remote base station 120 will conclude that the setpoint should be reduced at block 730. In this situation, the remote base station 120 will reduce the setpoint, similarly by an increment such as 1 dB for instance. As a result, the setpoint may be pushed lower than the measured $E_b/N_0$. Therefore, the remote base station 120 will instruct the mobile station 130 to reduce its transmit power. Such power control techniques may be used throughout the duration of a call to/from the mobile station 130 to dynamically adjust the transmit-power level for the forward link and/or reverse link signals.

Method for Selecting Transmission Power Based on Location

Referring now to FIG. 8, a method for location based power control that may be implemented cooperatively by the remote base station 120 and the mobile station 130 of FIG. 1 (e.g., using the remote base station 200 of FIG. 2) is shown. The method includes, at block 810, the remote base station 120 determining the location of a mobile station (e.g., the mobile station 130) that is about to engage in a call. The remote base station 120 may determine a location of the mobile station 130 in any of a variety of ways, preferably employing what have become increasingly conventional location-determining technologies. For example, if the mobile station is equipped with a location-determining mechanism such as a global-positioning-system (GPS) module, the mobile station 130 can regularly determine and report its current location to the remote base station 120 using industry standard messaging (such as that defined by industry standard IS-801 (published in October 1999 as TLA/EIA/IS-801)). As another example, a cellular carrier can employ any of a variety of network-based positioning determining equipment and techniques (such as triangularization, for instance) to establish a location of the mobile station 130. The carrier may maintain a record of mobile station locations in a mobile positioning center ("MPC"), and the remote base station 120 may query the MPC (through communication with the central base station 105) to identify the location of a given MS. Other examples are possible as well.

Once the remote base station 120 determines the location of the mobile station 130, the remote base station 120 then queries a database to obtain a transmit-power level that corresponds with the determined location at block 820. The remote base station 120 may include the database (not shown). Alternatively, another entity (e.g., the central base station 105) could obtain the location-based transmit-power level from the database and could report the transmit-power level to the remote base station 120. Still other arrangements are possible as well.

Provided with the location-based transmit-power level value(s), reverse link and/or forward link power control processes then proceed based on those values at block 830. The open-loop and closed-loop power techniques described above may be used with the location based transmit power level value(s) being used as the initial setpoints for $E_b/N_o$. the forward and/or reverse link signals.

CONCLUSION

Various arrangements and embodiments in accordance with the present invention have been described herein. It will be appreciated, however, that those skilled in the art will understand that changes and modifications may be made to these arrangements and embodiments without departing from the true scope and spirit of the present invention, which is defined by the following claims.

What is claimed is:

1. A remote base station for communicating with a mobile station over an air interface comprising:
   a first antenna receiving forward link wireless communication signals from a central base station;
   a second antenna receiving reverse link wireless communication signals from the mobile station;
   a first transceiver receiving the forward link wireless communication signals from the first antenna and sending the forward link wireless communication signals to the second antenna along a first signal path for transmission to the mobile station;
   a second transceiver receiving the reverse link wireless communication signals from the second antenna and sending the reverse link communication signals to the first antenna along a second signal path for transmission to the central base station; and
   a power control module coupled to each of the first transceiver and the second transceiver for adjusting a transmission power level for communication between the mobile station and the remote base station, wherein the transmission power level is a remote base station transmission power level used to transmit signals to the mobile station and the power control modules comprises service logic for adjusting the remote base station transmission power level based on an energy level $E_b/N_o$ of the forward link signals received by the mobile station and an estimate of a noise level in the air interface, wherein the energy level $E_b/N_o$ is determined by the mobile station and a value of $E_b/N_o$ is communicated to the remote base station by the mobile station via the second transceiver,
   the power control module further sending, to the mobile station, an instruction to transmit reverse link signals at a selected power level, wherein the mobile station responsively transmits reverse link signals at the selected power level.

2. The remote base station of claim 1, wherein the forward link wireless signals are transmitted from the central base station to the remote base station at a substantially fixed transmission power.

3. The remote base station of claim 1, wherein the reverse link signals are transmitted by the remote base station to the central base station at a substantially continuous transmission power.

4. The remote base station of claim 1, wherein the transmission power level is a mobile station transmission power level, and wherein the power control module comprises service logic for:
   determining an energy level $E_b/N_o$ of the reverse link signals received from the mobile station; and
   determining an adjustment to the mobile station transmission power level based on a comparison of the value of $E_b/N_o$ with a setpoint, wherein the determined adjustment is communicated to the mobile station by the remote base station using the first transceiver.

5. The remote base station of claim 1, wherein the transmission power level is a mobile station transmission power level, and wherein the power control module comprises service logic for:
   determining a frame error rate of the reverse link signals received from the mobile station; and
   determining an adjustment to a setpoint for the energy level of the mobile station transmission power level based on a comparison of the frame error rate with a threshold value.

6. The remote base station of claim 1, wherein the transmission power level is a remote base station transmission power level, and wherein the power control modules comprises service logic for:
   determining an adjustment to a setpoint for the energy level of the remote base station transmission power level based on a frame error rate of the forward link signals received by the mobile station, wherein the frame error rate is determined by the mobile station and communicated to the remote base station via the second transceiver.

7. The remote base station of claim 1, wherein the power control module comprises service logic for:

determining a location of the mobile station;
selecting a power level for communication between the mobile station and the remote base station based on the determined location; and
effecting communication between the remote base station and the mobile station at the selected power level.

8. The remote base station of claim 7, wherein selecting a power level for communication between the mobile station and the remote base station comprises:
referring to a database that correlates geographic locations with power levels; and
selecting from the database, a power level that corresponds with the determined location of the mobile station.

9. The remote base station of claim 8, wherein the selected power level is a mobile station transmit-power level, and wherein effecting communication between the mobile station and the remote base station comprises:
sending, to the mobile station, an instruction to transmit at the mobile station transmit-power level, wherein the mobile station responsively transmits at the mobile station transmit-power level.

10. The remote base station of claim 8, wherein the selected power level is a remote base station transmit-power level, and wherein effecting communication between the mobile station and the remote base station comprises:
setting the remote base station to transmit at the remote base station transmit-power level, wherein the remote base station responsively transmits at the remote base station transmit-power level.

11. A method of communicating with a mobile station, the method comprising:
receiving forward link signals from a central base station at a remote base station;
transmitting the forward link signals to the mobile station over an air interface;
receiving reverse link signals from the mobile station at the remote base station over the air interface;
transmitting the reverse link signals to the central base station; and
cooperatively adjusting a transmission power level for communication between the mobile station and the remote base station by sending, to the mobile station, an instruction to transmit reverse link signals at a selected power level, wherein the mobile station responsively transmits reverse link signals at the selected power level, and wherein the transmission power level includes a remote base station transmit-power level used to transmit signals to the mobile station, and wherein the remote base station transmit-power level is determined based on at least (i) an energy level $E_b/N_o$ of the forward link signals received by the mobile station and communicated to the remote base station by the mobile station, and (ii) an estimate of a noise level in the air interface.

12. The method of claim 11, further comprising:
determining an adjustment to the remote base station transmit-power level based on a comparison of a value of $E_b/N_o$ of the forward link signals received by the mobile station with a setpoint.

13. The method of claim 11, further comprising:
determining an adjustment to a setpoint for the remote base station transmit-power level based on a comparison of the frame error rate of the forward link signals received by the mobile station with a threshold frame error rate.

14. The method of claim 11, wherein the selected power level is determined based on at least one of an energy level $E_b/N_o$ and a frame error rate of the reverse link signals received by the remote base station.

15. The method of claim 14, further comprising:
determining an adjustment to the selected power level based on a comparison of a value of $E_b/N_o$ of the reverse link signals received by the remote base station with a setpoint.

16. The method of claim 14, further comprising:
determining an adjustment to the selected power level based on a comparison of the frame error rate of the reverse link signals received at the remote base station with a threshold frame error rate.

17. The method of claim 11, wherein the forward link signals from the central base station are received at a substantially constant transmission power.

18. The method of claim 11, wherein the reverse link signals are transmitted to the central base station at a substantially constant transmission power.

19. The method of claim 11, wherein cooperatively adjusting a transmission power level for communication between the mobile station and the remote base station comprises:
determining a location of the mobile station;
selecting a power level for communication between the mobile station and the remote base station based on the determined location; and
effecting communication between the remote base station and the mobile station at the selected power level.

20. The method of claim 19, wherein selecting a power level for communication between the mobile station and the remote base station based on the determined location comprises:
referring to a database that correlates geographic locations with power levels; and
selecting from the database a power level that corresponds with the determined location of the mobile station.

21. The method of claim 19, wherein effecting communication between the mobile station and the remote base station comprises:
setting the remote base station to transmit at a remote base station transmit-power level, wherein the remote base station responsively transmits at the remote base station transmit-power level.

22. The method of claim 19, further comprising:
implementing open-loop power control with the selected power level being employed as an initial $E_b/N_o$ setpoint; and
implementing closed-loop power control when the $E_b/N_o$ setpoint matches a measured value of $E_b/N_o$.

23. A wireless communication system comprising:
a central base station;
a remote base station in communication with the central base station; and
a mobile station in communication with the remote base station over an air interface, the remote base station comprising:
a first antenna receiving forward link wireless communication signals from a central base station;
a second antenna receiving reverse link wireless communication signals from the mobile station;
a first transceiver receiving the forward link wireless communication signals from the first antenna and sending the forward link wireless communication signals the second antenna along a first signal path for transmission to the mobile station;
a second transceiver receiving the reverse link wireless communication signals from the second antenna and sending the reverse link wireless communication signals to the first antenna along a second signal path for transmission to the central base station; and a power control module coupled to each of the first transceiver and the second transceiver for adjusting a transmission power level for communication between the mobile station and the remote base station, wherein the transmission power level is a remote base station transmission power level used to transmit signals to the mobile station and the power control modules comprises service logic for adjusting the remote base station transmission power level based on an energy level $E_b/N_o$ of the forward link signals received by the mobile station and an estimate of a noise level in the air interface, wherein the energy level $E_b/N_o$ is determined by the mobile station and a value of $E_b/N_o$ is communicated to the remote base station by the mobile station via the second transceiver, the power control module further sending, to the mobile station, an instruction to transmit reverse link signals at a selected power level, wherein the mobile station responsively transmits reverse link signals at the selected power level.

* * * * *

UNITED STATES PATENT AND TRADEMARK OFFICE
CERTIFICATE OF CORRECTION

PATENT NO. : 7,574,230 B1  Page 1 of 1
APPLICATION NO. : 10/873588
DATED : August 11, 2009
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Seventh Day of September, 2010

David J. Kappos
*Director of the United States Patent and Trademark Office*